W. M. RAPE.
Seed-Planter.
No. 208,847.　　　　　　　　Patented Oct. 8, 1878.
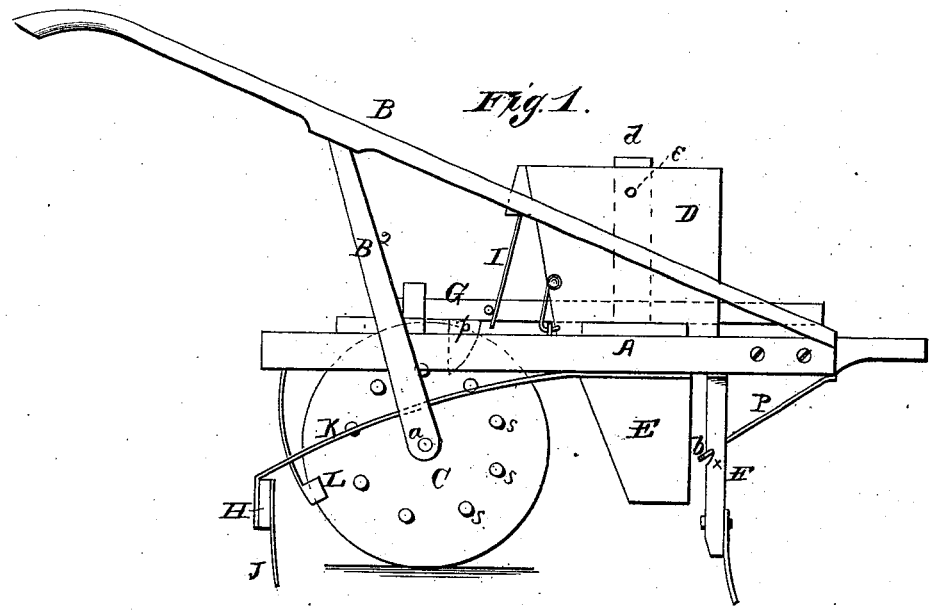
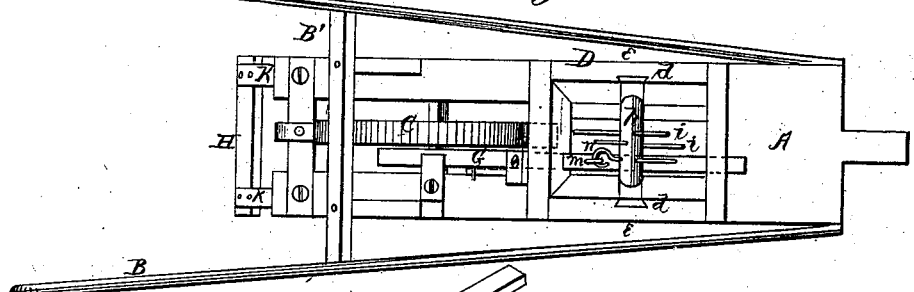
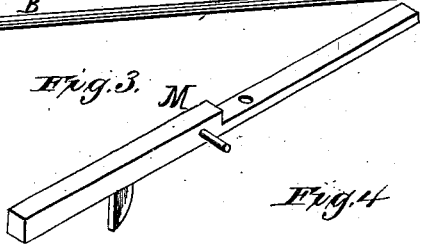
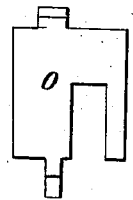
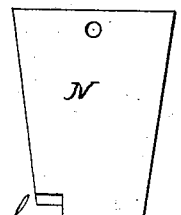
WITNESSES
F. L. Ourand
H. Aubrey Toulmin
INVENTOR
Wm. M. Rape
Alexander & Mason
ATTORNEYS

UNITED STATES PATENT OFFICE.

WILLIAM M. RAPE, OF NOTASULGA, ALABAMA.

IMPROVEMENT IN SEED-PLANTERS.

Specification forming part of Letters Patent No. 208,847, dated October 8, 1878; application filed August 23, 1878.

*To all whom it may concern:*

Be it known that I, WM. M. RAPE, of Notasulga, in the county of Tallapoosa, and in the State of Alabama, have invented certain new and useful Improvements in Seed-Planters; and do hereby declare that the following is a full, clear, and exact description thereof, reference being had to the accompanying drawings, and to the letters of reference marked thereon, making a part of this specification.

The nature of my invention consists in the construction and arrangement of a seed-planter, as will be hereinafter more fully set forth.

In order to enable others skilled in the art to which my invention appertains to make and use the same, I will now proceed to describe its construction and operation, referring to the annexed drawings, in which—

Figure 1 is a side elevation, and Fig. 2 a plan view, of my invention. Figs. 3, 4, and 5 are detailed views of parts to be used in the planter when desired to plant corn, pease, &c., in hills.

A represents the frame of my planter, provided with the handles B B, the front ends whereof are fastened to the front end of the frame. These handles are connected by a round or cross-bar, B¹, which is supported upon two standards, B² B², secured to the sides of the frame. In the lower ends of the standards B² is mounted a shaft, $a$, upon which is secured the driving-wheel C. In front of this wheel, on the frame, is attached the hopper D, and below the same is the conductor or chute E, to conduct the seed into the ground. In front of the chute E, to the under side of the frame, is secured the plow-foot F, which is made of a single piece of metal bent double, so as to form two parallel side pieces, the upper ends whereof are turned outward, forming flanges for the passage of the fastening-bolts.

The plow-foot F is held by means of a brace, P, which is fastened to the frame, and has a T-head, $b$, on its rear end, said head being inserted in the plow-foot, and the head fitting in notches $x$ on the back thereof, as shown.

In the sides of the hopper D are dovetailed grooves, in which are inserted slides $d\ d$, said slides being held by pins $e$. The lower ends of the slides $d$ carry a shaft or roller, $h$, provided with a number of radial rods or arms, $i$, which constitute a stirrer for agitating the seed. This stirrer is operated by means of a slide, G, which has a pin, $m$, passing through an eyebolt, $n$, fastened in the roller. The slide G is provided with a lug, $p$, which is operated by means of a series of pins, $s$, arranged in circular form, and projecting from the side of the wheel C. As the machine moves forward, each pin $s$ in succession, acting on the lug $p$, moves the slide G forward, which turns the stirrer $h\ i$ a certain distance. As soon as the pin $s$ has passed the lug $p$, a spring, I, returns the slide and stirrer to their former positions. Behind the wheel C are coverers J J, secured to a bar, H, and this bar attached to two spring-arms, K K, which are fastened to the frame. L is a scraper for keeping the edge of the wheel C free from dirt.

This machine can also be used as a corn-planter by removing the slide and stirrer and substituting the slide M, the partition N, and bottom O, said parts being shown respectively in Figs. 3, 4, and 5. The distance between the hills of corn is then regulated by the pins or cogs $s$ in the wheel C—that is to say, by using one, two, or more of said pins.

Having thus fully described my invention, what I claim as new, and desire to secure by Letters Patent, is—

1. The stirrer $h\ i$, mounted in dovetailed slides $d$ in the hopper D, in combination with the slide G, as set forth.

2. The combination of the wheel C, with pins $s\ s$, the slide G, with lug $p$ and pin $m$, and the stirrer $h\ i$, with eyebolt $n$, substantially as and for the purposes herein set forth.

In testimony that I claim the foregoing I have hereunto set my hand this 4th day of July, 1878.

WILLIAM M. RAPE.

Witnesses:
JOHN W. WHITE,
ROBERT A. SENTELL.